United States Patent [19]

Hall

[11] Patent Number: 5,709,397
[45] Date of Patent: Jan. 20, 1998

[54] HEAVY EQUIPMENT MOVING DOLLY

[76] Inventor: John R. Hall, 38 Willow La., New Hartford, Conn. 06057

[21] Appl. No.: 646,960

[22] Filed: May 8, 1996

[51] Int. Cl.$^6$ .................................................. B62B 1/00
[52] U.S. Cl. ................................... 280/47.17; 280/47.21; 414/490
[58] Field of Search .................... 280/43.1, 43.11, 280/47.17, 47.2, 47.21, 47.23, 47.24, 47.29, 79.11; 414/444, 445, 457, 490; 298/2; 269/289 R

[56] References Cited

U.S. PATENT DOCUMENTS

| | | | |
|---|---|---|---|
| 1,299,829 | 4/1919 | Goodyear | 280/47.24 |
| 1,374,372 | 4/1921 | Freund | 280/47.17 |
| 1,802,809 | 4/1931 | Funk . | |
| 2,019,256 | 10/1935 | Dutton | 280/53 |
| 4,566,708 | 1/1986 | Specie | 280/47.24 X |
| 4,639,005 | 1/1987 | Birkley | 280/47.21 X |
| 4,735,424 | 4/1988 | Stelter | 280/43.1 |
| 4,921,264 | 5/1990 | Duffy | 280/79.11 |
| 5,593,271 | 1/1997 | Hall | 280/47.21 X |
| 5,599,031 | 2/1997 | Hodges | 280/79.11 |

*Primary Examiner*—Brian L. Johnson
*Assistant Examiner*—Pamela J. Lipka
*Attorney, Agent, or Firm*—William C. Crutcher

[57] ABSTRACT

A dolly with a U-shaped frame which is adjustable both in length and width, has a pair of wheels and a pair of brackets on the ends of the U-shaped frame. A heavy object to be moved includes two transverse members extending between opposite legs. At least one of the transverse members has retractable arms. The heavy object is first lifted at one end by the brackets beneath one transverse member then the retractable arms are extended and the other end of the heavy object is lifted onto the pair of wheels. A removable set of auxiliary wheels assists in transporting the object to a new location.

14 Claims, 3 Drawing Sheets

HEAVY EQUIPMENT MOVING DOLLY

BACKGROUND OF THE INVENTION

This invention relates generally to dollys for moving heavy equipment, and more particularly to an improved dolly adapted to engage and lift heavy equipment with a minimum of effort and having provisions for transporting and relocating such equipment.

It is often necessary to relocate heavy equipment, such as a piece of heavy machinery supported on a supporting structure, such as a workbench or table. This is particularly important in a confined work space area where several such items of heavy equipment are located, each usually of different longitudinal and transverse dimensions, shapes, sizes and weights. The usual procedure to relocate such equipment requires several people to lift the equipment onto a wheeled dolly, push it to its new location while holding it in place, and then to lift if off the dolly. It would be desirable to arrange the dolly so that it could be manipulated and operated by only a single operator who could hoist the equipment from the floor, transport it to a new location and then lower it to the floor again.

Several arrangements have been suggested in the prior art for assisting an operator to lift and transport bulky heavy objects. For example, U.S. Pat. No. 4,735,424 issued Apr. 5, 1988 to Stelter shows a U-shaped cart which is wheeled to the object so that the legs of the frame pass beneath the object with the frame lying flat on the floor. Then the object is lifted all at once with the frame rising in a horizontal position. This device requires the total weight of the object to be lifted all at one time, using leverage provided by the frame and wheel brackets.

Other devices have been shown to reduce the effort of lifting a load to be transported by accomplishing lifting in two stages, so that one operator can handle the job. For example in U.S. Pat. No. 2,019,256 issued Oct. 29, 1935 to Dutton, a mill roll is hoisted onto a two wheel transport dolly by first engaging a spindle on the far end of the roll with a permanent strap and tilting one end of the roll upward with the handle, and then engaging a spindle on the other end of the roll with a chain and hoisting that end of the load with the handle. This device is designed only to service mill rolls with spindles at each end.

Another arrangement employing a U-shaped frame with two wheels which hoist the object to be lifted in two stages is shown in U.S. Pat. No. 1,802,809 issued Apr. 28, 1931 to Funk. This device employs a special carrier cam which engages two transverse permanent projections on each of the opposed sides of the load. Since the device is not adjustable and requires predetermined locations of the transverse permanent projections, it is not adaptable to transport heavy objects a variety of shapes and sizes.

Accordingly, one object of the present invention is to provide an improved dolly for lifting and transporting heavy objects which can be operated by a single individual.

Another object of the present invention is to provide an improved dolly which lifts an object to be transported in two stages, so that a single operator can lift the object.

Still another object of the invention is to provide an improved two-wheeled dolly for lifting heavy objects onto the dolly, and then providing additional auxiliary wheels so that the object can be moved to a new location by a single operator.

DRAWING

These and many other objects will become apparent by reference to the following description, taken in connection with the accompanying drawing, in which:

FIG. 1 is a top plan view of the improved dolly with a portion of a heavy object to be lifted shown to the left in dashed lines, FIG. 2 is a top plan view of the improved dolly of the present invention, positioned to enclose the heavy object, comprising a work table indicated in dashed lines, FIG. 3 is a side elevational drawing of the dolly of FIG. 2, FIG. 3a is an enlarged cross sectional view illustrating the details of attachment of the auxiliary wheel set to the dolly of FIG. 3, FIG. 4 is a simplified diagrammatic view of the dolly of FIGS. 2 and 3 shown in the first step of engaging a heavy object to be moved, FIG. 5 is a side elevational view similar to FIG. 4, illustrating the dolly in the second step of engaging and lifting one end of the heavy object, FIG. 6 is a side elevational view similar to FIGS. 4 and 5, showing the third step in engaging and lifting the other end of the heavy object into a position to be transported, FIG. 7 is a perspective view of a heavy object such as a four leg work bench carrying heavy machinery (not shown), illustrating the transverse support members utilized in the present invention, and FIG. 8 is a top plan view of a modified frame of the improved dolly.

SUMMARY OF THE INVENTION

Briefly stated the invention is practiced by providing apparatus for moving heavy equipment disposed on a substantially rectangular supporting structure having a longitudinal dimension and a transverse dimension, said apparatus comprising first transverse support means adapted for attachment to one end of the supporting structure and having a pair of first support arms extending transversely beyond the transverse dimension of the supporting structure, second transverse support means adapted for attachment to the other end of the supporting structure and having a pair of second support arms arranged to be selectively extended beyond the transverse dimension of the supporting structure, a dolly having a substantially U-shaped frame with an internal length and an internal width, the frame comprising a pair of longitudinal beams each having first and second ends, and a cross member extending between the first ends of the longitudinal beams, the longitudinal beams and the cross member having means for adjusting the internal length and the internal width of the frame over ranges which include said respective longitudinal and transverse dimensions of the supporting structure, a pair of wheels, each rotatably mounted on a respective one of the longitudinal beams toward the second end thereof, a pair of receiving brackets disposed on the respective second ends of the longitudinal beams and dimensioned and arranged to receive the first transverse support arms when the second ends of the longitudinal beams are first tilted below a horizontal plane and positioned beneath the first transverse support arms, the receiving brackets being so located and dimensioned as to allow an operator to elevate one end of the supporting structure using the wheels as a fulcrum when the first ends of the longitudinal beams are lowered below a horizontal plane, said selectively extendable second support arms arranged to be supported on the first ends of the longitudinal beams when the beams are returned to a horizontal plane.

In its preferred embodiment, a set of auxiliary wheels and a handle may be added to facilitate transporting the heavy object.

DESCRIPTION OF THE PREFERRED EMBODIMENT

Figure 1:
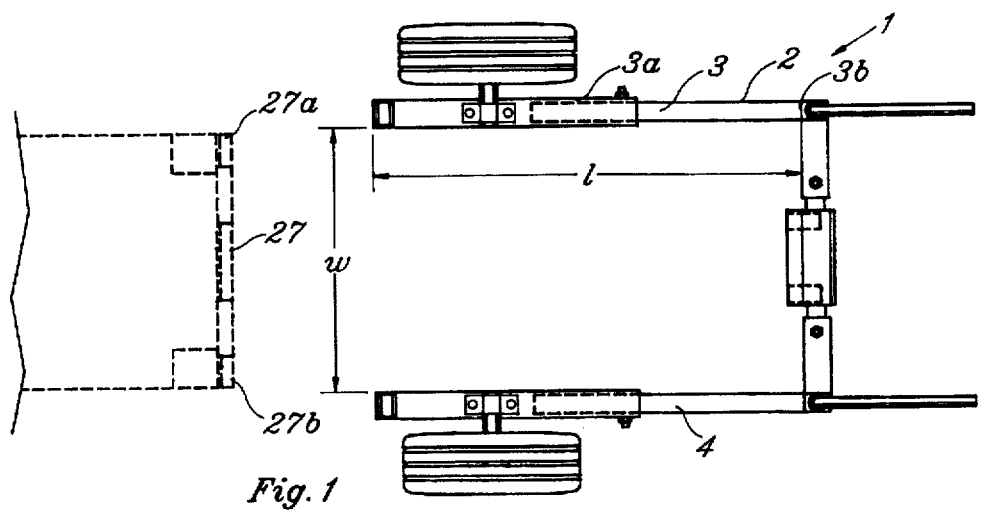
Figure 2:
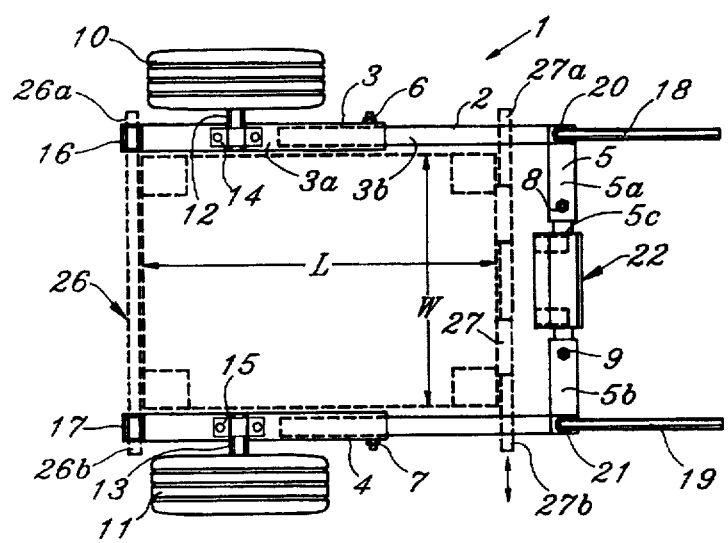

Referring to FIGS. 1 and 2 of the drawing, a dolly shown generally at 1 includes a U-shaped frame 2 having a variable internal length 1 and a variable internal width w. The frame comprises a pair of longitudinal beams 3, 4 and a cross member 5 extending between ends of the beams 3, 4 and rigidly attached thereto. Beams 3, 4 and cross member 5 are heavy duty channel, I-beam or tubular construction. Beam 3 is constructed of two telescoping members 3a, 3b with clamping bolts 6 so as to adjust the length 1 of the frame. Similarly, beam 4 consists of two telescoping members 4a, 4b with clamping bolts 7.

Cross member 5 consists of two larger sections 5a, 5b receiving a smaller member 5c of less cross-section, which is received within the ends of both sections 5a, 5b and clamped thereto by means of bolts 8, 9 so as to adjust the width w of frame 2. A pair of wheels 10 and 11 are mounted on longitudinal beams 3, 4 by means of axles 12, 13 and brackets 14, 15. In order to provide the proper leverage, the wheels 10, 11 are mounted toward the end of the U-shaped frame opposite the end having cross member 5.

Disposed on the ends of longitudinal beams 3, 4 are a pair of receiving brackets 16, 17, which have upwardly directed semi-cylindrical receptacles.

A pair of L-shaped handle members 18, 19 are adapted for attachment to the frame 2 by insertion into sockets 20, 21 arranged at the corners of the frame, and being provided with suitable pins (not shown) to permit swiveling in the sockets. Many conventional attachments are suitable and not relevant to the present invention. Handles 18, 19, therefore can be used to manipulate the loaded dolly.

In order to further assist the movement and manipulation of the loaded dolly, a set of removable auxiliary wheels are shown generally by reference number 22. The set of wheels 22 is shown in greater detail in the cross section of FIG. 3a to comprise a channel-shaped support piece 23 hinged to an L-shaped wheel support 24. A pair of wheels 25 are rotatably mounted on the end of wheel support 24. Channel 23 is adapted to fit over the top of the cross member portion 5c as indicated by the arrows in FIG. 3a. The wheel support member 24 and wheels 25 are shown in the stored position. After the object is loaded, the wheel support 24 and wheels 25 are pivoted into transporting position shown in FIG. 3. Because of the location of the angle bracket placing the wheel beneath the frame, the weight of the frame prevents wheels 25 from becoming disengaged, as should be apparent from the drawing.

Referring again to FIG. 2 of the drawing, the load to be lifted is depicted as a four legged work table with a length L and a width W. The dolly frame 2 is arranged to be adjustable over ranges of its variable internal length 1 and its variable internal width w which include the longitudinal dimension L and a longitudinal width W of the object to be transported.

The object to be lifted, includes a first transverse support bar indicated by reference numeral 26 attached to the support structure and having a pair of support arms 26a and 26b extending beyond the transverse dimension W of the supporting structure. A second transverse support member 27 is attached to the opposite end of the supporting structure. Member 27 includes a pair of support arms 27a, 27b which are arranged to be selectively extended beyond the transverse dimension W of the supporting structure, or retracted to lie within dimension W. In FIG. 1, the support arms 27a, 27b are shown in a retracted or non-extended position. In FIG. 2, arms 27a, 27b are shown in an extended position.

Figure 7:
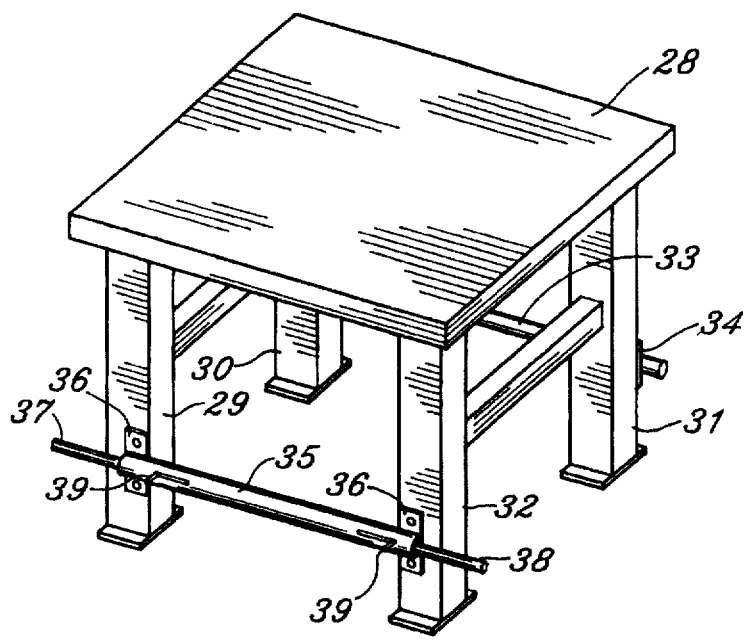

Referring to FIG. 7 of the drawing, a perspective view is shown of a work table 28 having four legs 29, 30, 31, 32. The first transverse member comprises a bridging member such as a rod 33 permanently attached to legs 30, 31 by brackets such as 34. The ends of transverse rod 33 extend beyond the width of the table 28. The second transverse member comprises a tube 35 serving as a bridging member extending between legs 29, 32 and is attached by brackets 36. Tube 35 houses extendable support arms 37, 38 which are rods sliding within the tube 35. Pins, such as 39, attached to the rods are moveable within slots in tube 35 to enable selective movement of the rods 37, 38 to either extend or retract them.

OPERATION

Figure 4:
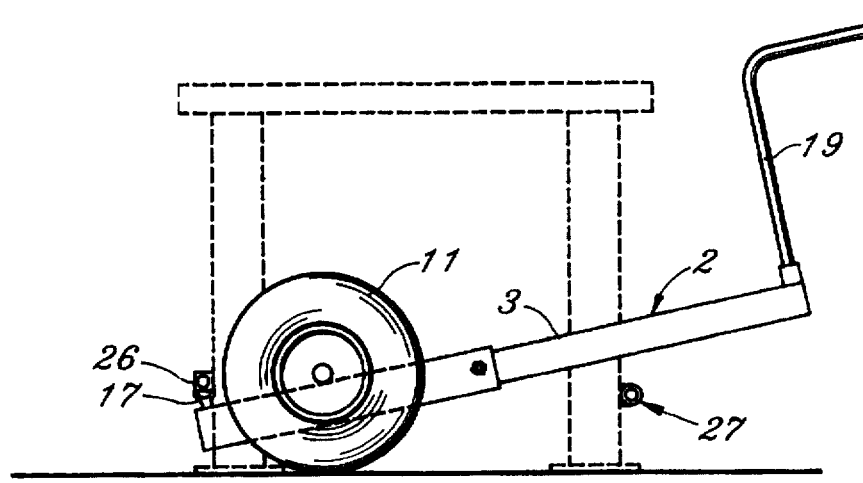
Figure 5:
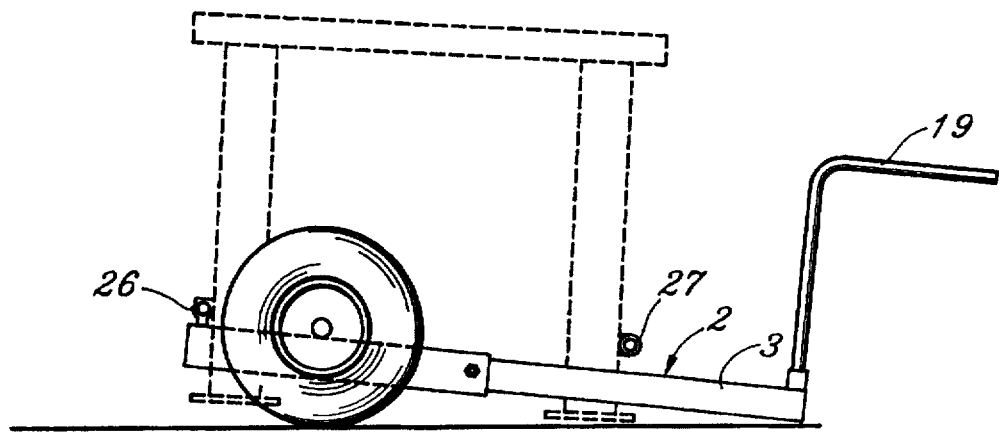
Figure 6:
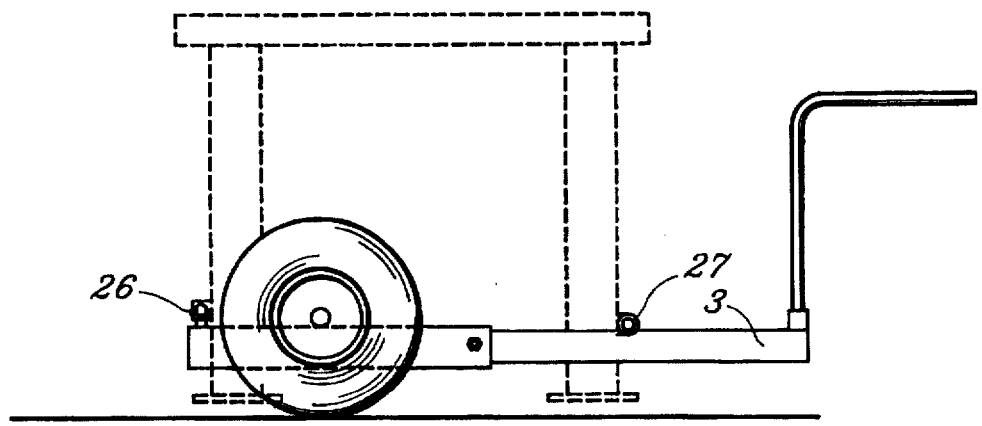

Referring to FIGS. 4, 5 and 6 of the drawing the operation is clearly shown. The frame 2 is first adjusted to conform in internal width and length to the transverse and longitudinal dimensions of the heavy equipment supporting structure. The extendable support arms 27a, 27b of the transverse support member 27 are retracted. Next the frame 2 is rolled on the wheels, one of which is seen at 11 to envelop the supporting structure. Frame 2 is positioned so that the two receiving brackets, one of which is seen at 17, are located beneath the two support arms of transverse member 26. This is accomplished by tilting the frame 2 as shown in FIG. 4.

Next referring to FIG. 5, the frame 2 is tilted in the opposite direction, and weight placed on the end of frame 2, so that beams 3 and 4 act as a lever with the wheel acting as a fulcrum to raise one end of the supporting structure off the floor or ground. Because of the length of the lever arm, this is easily accomplished by one operator. Next the extendable support arms 27a, 27b of the transverse member 27 are extended, and the frame 2 is lifted to a horizontal plane by handle 19. Before reaching the horizontal position beams 3 and 4 intercept the arms 27a, 27b of transverse member 27, and lift the other legs of the supporting structure off the floor or ground.

Figure 3:
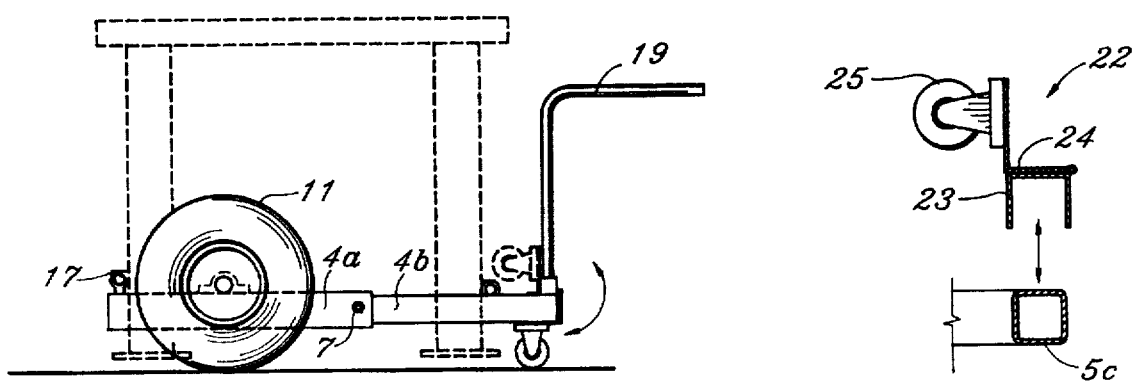
Figure 3A:
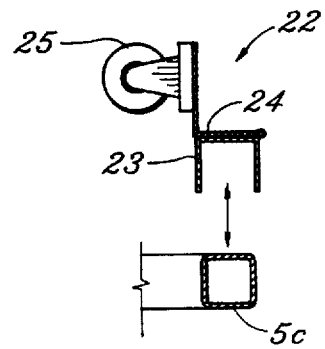

If the load is not too heavy, it can be transported in this manner as shown in FIG. 6, by maintaining upward force on the handles. On the other hand for extremely heavy loads and moving the object for a greater distance, the set of auxiliary wheels 22 may be added as shown in FIG. 2a and positioned as shown in FIG. 3. In this position the dolly is more stable and may be used to roll the object to a new location without requiring any lifting force by the operator.

MODIFICATION

Figure 8:
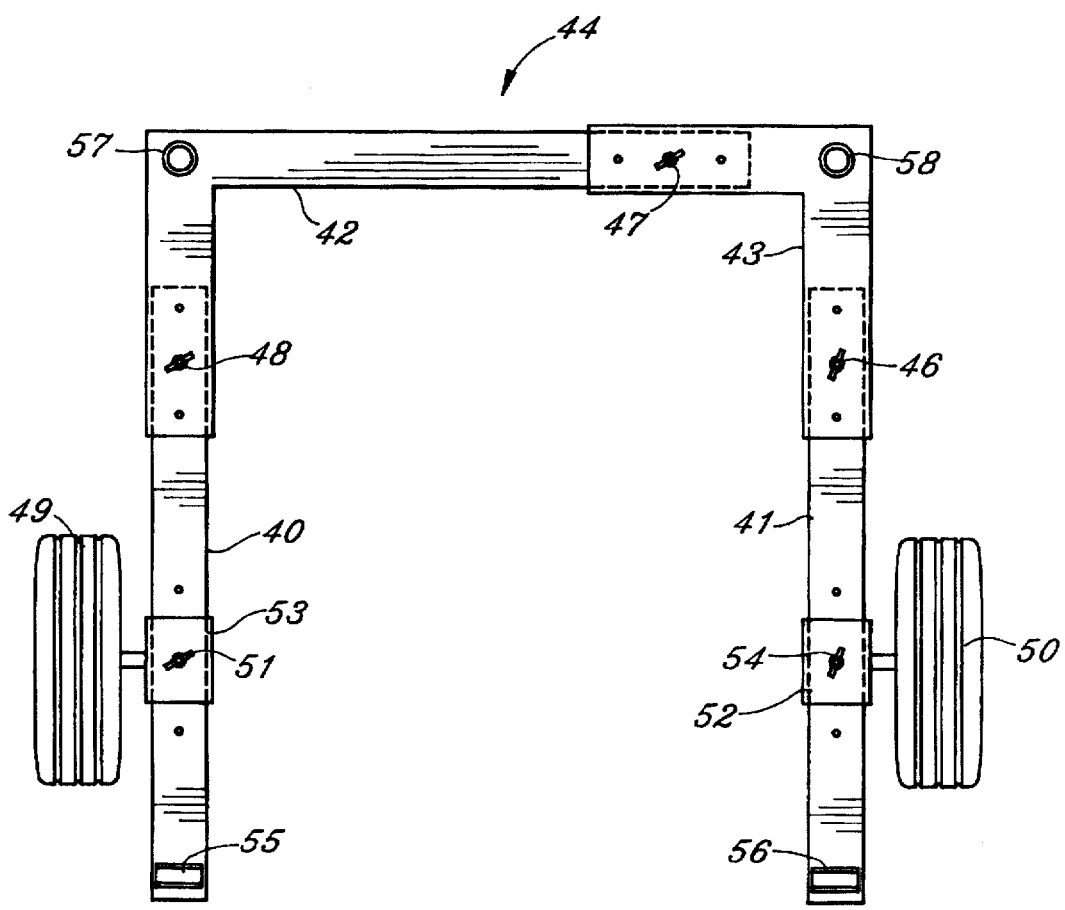

FIG. 8 illustrates a modified form of the invention. In this case, a pair of longitudinal members 40, 41 and a pair of L-shaped members 42, 43 together comprise the longitudinal beams and the cross member for a U-shaped frame shown generally as 44. L-shaped member 43 receives the end of longitudinal member 41 in a telescoped connection which is adjustable by means of pin 46. L-shaped member 43 also receives one end of L-shaped member 42 in a telescoped connection with width selected by a pin 47. Lastly, L-shaped member 42 receives one end of longitudinal member 40 in a telescoped connection with the length selected by pin 48. By means of pins 46, 47 and 48, the length and width of frame 44 can be adjusted in a manner similar to frame 2 previously described. Wheels 49, 50 are further caused to be adjustable along the longitudinal members 40, 41 respectively by means of slidable channels 51, 52 with locking thumb screws 53, 54. Receiving brackets 55, 56 are mounted on the ends of longitudinal members 40, 41 similarly to those previously described.

Lastly, each of the L-shaped members 42, 43 is adapted to receive a handle by means of sockets indicated at 57, 58.

Adjustability of the wheels 49, 50 along the length of the longitudinal beams is useful where the load is not symmetrically disposed on the object to be lifted. This allows the lifting of the load in two stages to be equally distributed in terms of effort required by the operator.

While the terms length, width, longitudinal, and transverse have been used to refer to the supporting structure and the frame of the dolly, these are obviously convenient terms descriptive of most arrangements and are not intended to limit the scope of the claims.

While there has been described what is considered to be the preferred embodiment of the invention, other modifications will occur to those skilled in the art, and it is desired to secure in the appended claims all such modifications as fall within the true spirit and scope of the invention.

I claim:

1. Apparatus for moving heavy equipment including a substantially rectangular supporting structure having a longitudinal dimension and a transverse dimension, said apparatus comprising:

first transverse support means adapted for attachment to one end of said supporting structure and having a pair of first support arms extending transversely beyond the transverse dimension of the supporting structure, second transverse support means adapted for attachment to the other end of the supporting structure and having a pair of second support arms arranged to be selectively extended beyond the transverse dimension of the supporting structure, a dolly having a substantially U-shaped frame with an internal length and an internal width, said frame comprising a pair of longitudinal beams each having first and second ends, and a cross member extending between the first ends of the longitudinal beams, the longitudinal beams and the cross member having means for adjusting a variable internal length and a variable internal width of the frame over ranges which include said respective longitudinal and transverse dimensions of the supporting structure, a pair of wheels, each rotatably mounted on a respective one of said longitudinal beams toward the second end thereof, a pair of receiving brackets disposed on the respective second ends of the longitudinal beams and dimensioned and arranged to receive the first transverse support arms when the second ends of the longitudinal beams are first tilted below a horizontal plane and positioned beneath the first transverse support arms, said receiving brackets being so located and dimensioned as to allow an operator to elevate one end of the supporting structure using the wheels as a fulcrum when the first ends of the longitudinal beams are lowered below a horizontal plane, said selectively extendable second support arms arranged to be supported on the first ends of the longitudinal beams when the beams are returned to a horizontal plane.

2. The apparatus according to claim 1, and further including a set of auxiliary wheels adapted for allowing the first ends of the longitudinal beams to be lowered and for supporting the cross member of the frame, whereby the heavy equipment may be transported on said pair of wheels and said set of auxiliary wheels.

3. The apparatus according to claim 1, whereby each of said pair of wheels is longitudinally adjustable along its respective longitudinal beam.

4. The apparatus according to claim 1, wherein said first and second transverse support means each comprise bridging members adapted for attachment between spaced legs of the supporting structure, at least said second bridging member adapted to receive said second support arms in opposite ends thereof.

5. The apparatus according to claim 1, wherein each of said pair longitudinal beams comprises at least sections in a telescoped connection, with means for locking the sections in more than one position.

6. The apparatus according to claim 1, wherein said cross member comprises at least two sections in a telescoped connection, with means for locking the sections in more than one position.

7. The apparatus according to claim 1, wherein each of said pair longitudinal beams and said cross member comprises at least two sections in a telescoped connection, with means for locking the sections in more than one position.

8. The apparatus according to claim 1, wherein the U-shaped frame comprises two longitudinal members and two L-shaped members joined together to make up the pair of longitudinal beams and the cross member.

9. The combination according to claim 8, wherein the longitudinal members and the L-shaped members are connected with telescoped connections, with means for locking each of the longitudinal members and L-shaped members in more than one position.

10. The apparatus according to claim 1, wherein each of the pair of receiving brackets defines an upwardly directed semi-cylindrical receptacle, and wherein said first support arms are rods dimensioned to fit said receptacles.

11. The apparatus according to claim 2, wherein said set of auxiliary wheels is removable and comprises a channel member adapted to fit over the cross member, and a wheel support member hinged thereto on one end and having a pair of wheels rotatably mounted on the other end thereof.

12. The apparatus according to claim 11, wherein said wheel support member is arranged to place the pair of wheels above the cross member in a first position to allow tilting the frame, and in a second position beneath the cross member to allow transporting the frame.

13. The combination according to claim 1, including a handle adapted for attachment to said frame.

14. The combination according to claim 13, wherein said handle comprises a pair of L-shaped handle members having lower ends, and wherein said frame includes sockets at opposite ends of the cross member adapted to receive the lower ends of the handle members.

* * * * *